United States Patent [19]

Jensen

[11] Patent Number: 5,054,177
[45] Date of Patent: Oct. 8, 1991

[54] TIRE RASP BLADE

[75] Inventor: Wayne E. Jensen, Olympia Fields, Ill.

[73] Assignee: B & J Manufacturing Company, Glenwood, Ill.

[21] Appl. No.: 344,920

[22] Filed: Apr. 28, 1989

Related U.S. Application Data

[63] Continuation-in-part of Ser. No. 166,176, Mar. 10, 1988.

[51] Int. Cl.⁵ .............................................. B23D 71/00
[52] U.S. Cl. ............................................ 29/78; 29/79; 407/56; 407/60; 407/61; 83/846; 83/853
[58] Field of Search .............................. 407/56, 60, 61; 29/76.1, 78, 79; 83/846, 853

[56] References Cited

U.S. PATENT DOCUMENTS 3,680,185  8/1972  Wood ........................................ 29/79
4,091,516  5/1978  Jensen et al. ............................. 29/79
4,283,819  8/1981  Willinger ................................. 29/79

FOREIGN PATENT DOCUMENTS 1300102  12/1972  United Kingdom .................... 29/78

Primary Examiner—James G. Smith
Assistant Examiner—Jack Lavinder
Attorney, Agent, or Firm—Niro, Scavone, Haller & Niro

[57] ABSTRACT

A tire rasp blade is provided with an elongated planar body having a working portion comprising a plurality of uniformly and closely spaced teeth which define an arcuate working perimeter. Each of the teeth has a base and a working edge and is separated from neighboring teeth by generally elliptical primary cutouts which are oriented normal to the tangent of the working perimeter. The teeth are preferably monolithic and of a uniform size and shape, and are both angularly set and laterally displaced relative to the plane of the blade body.

17 Claims, 3 Drawing Sheets

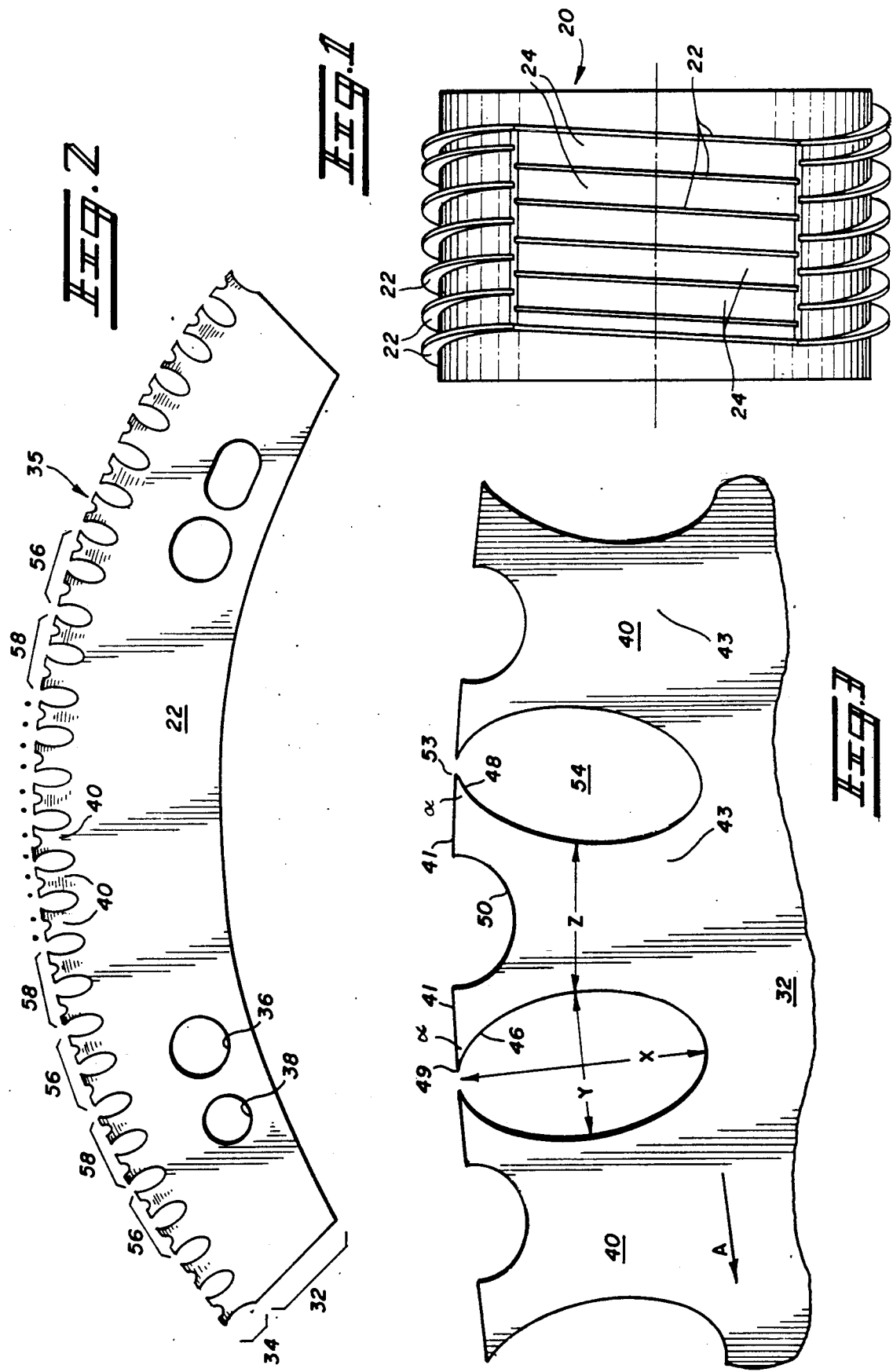

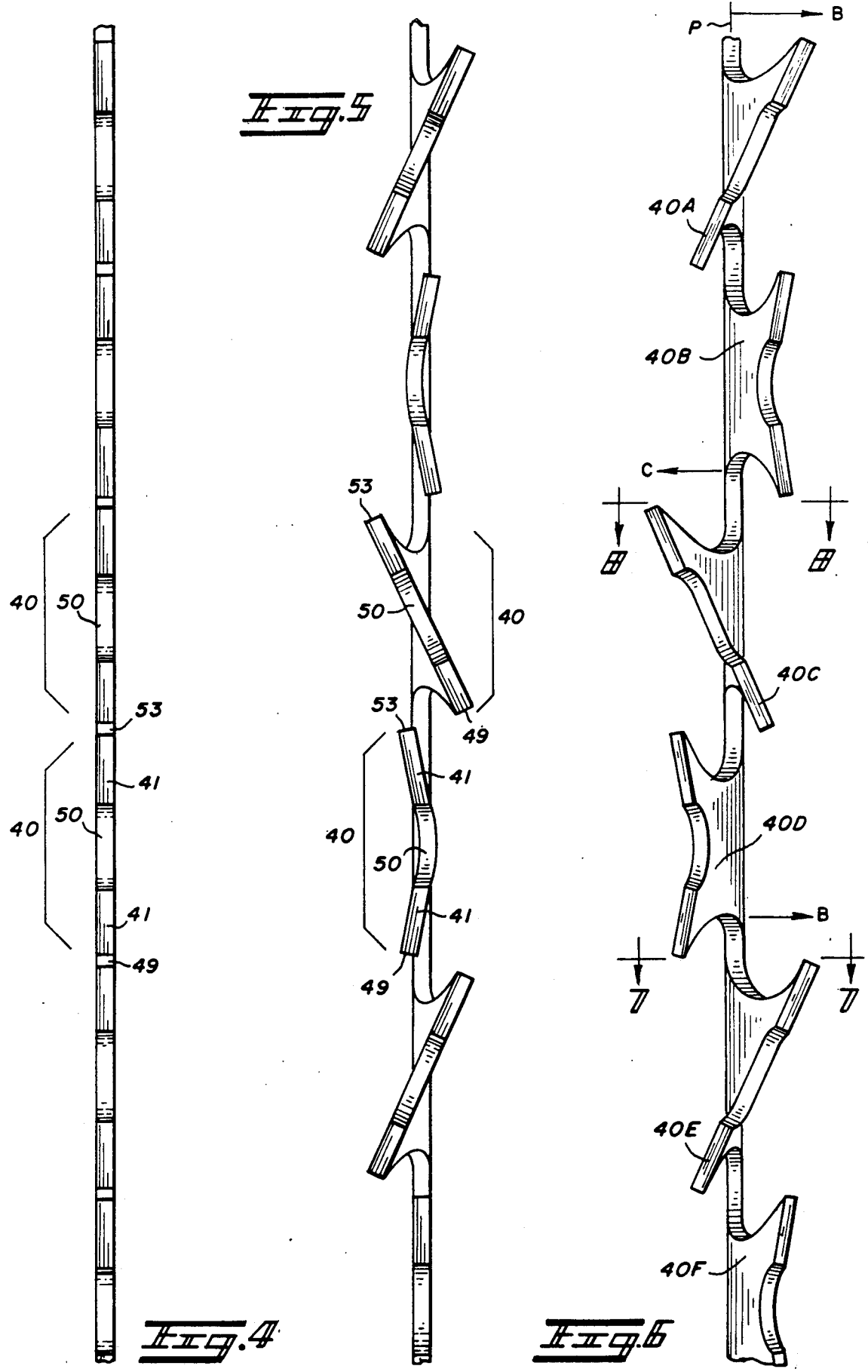

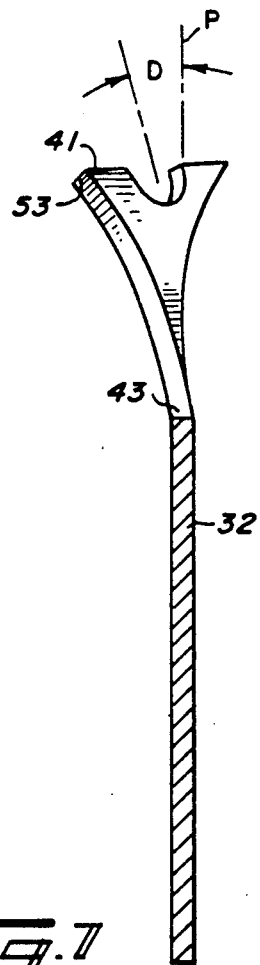
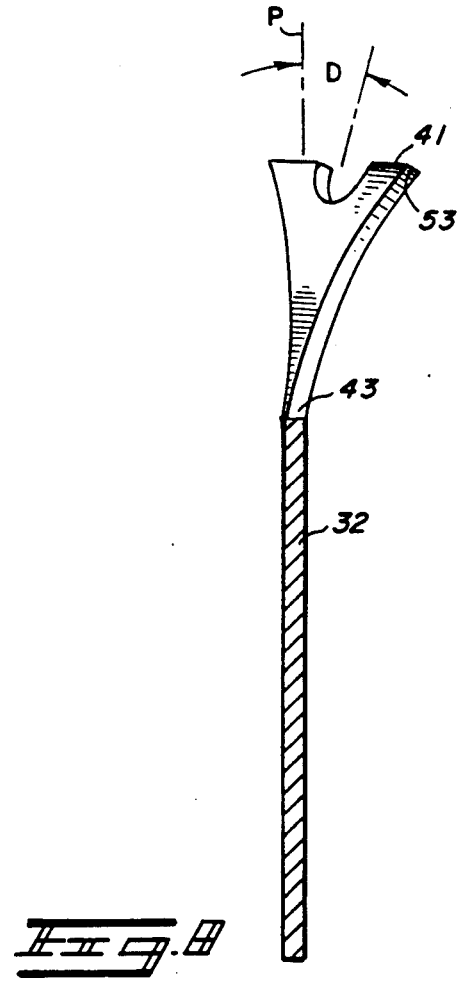
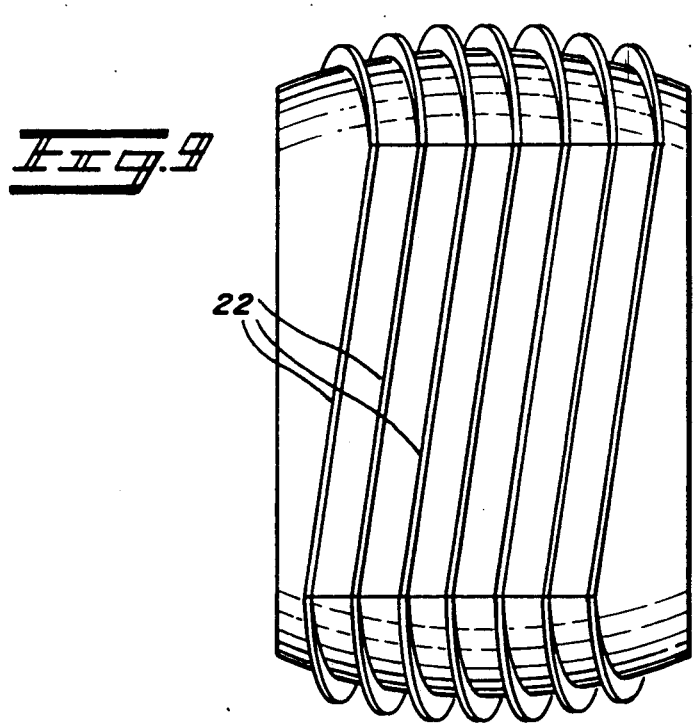

TIRE RASP BLADE

This application is a continuation-in-part of U.S. Patent application Ser. No. 07/166,176 filed Mar. 10, 1988.

BACKGROUND OF THE INVENTION

The present invention relates to a new and uniquely constructed rasp blade for use in tire buffing machines to properly precondition tires in preparation for retreading. More particularly, the present invention relates to a tire rasp blade having a novel construction of the blade's working edge such that a maximum number of teeth may be employed in the blade for improved performance and a longer useful life.

Tire rasp blades have been used for many years in the tire retreading industry. These blades are mounted to the rotating hub of the tire buffing machine and, when engaged with the used tire carcass, they cut or shear segments of rubber from the tread surface area of the tire. In this way, the tire is "buffed" to remove the unwanted used tread and to achieve an evenly textured surface suitable for retreading. There are several distinct performance characteristics that are important to the successful operation and use of such tire rasp blades. The speed or efficiency of rubber removal during the tire buffing process is very important; by removing the unwanted rubber tread from the tire more quickly, the labor cost associated with the retreading process is reduced. It is also essential, however, that the tire rasp blade exhibits good durability—that is, the teeth positioned on the blade should not bend, break or otherwise fail prematurely. It is also important that the blade not generate excessive heat during the buffing operation, since the tire surface can be damaged or even burned by increased temperatures with the result that an effective retread is not possible. Finally, it is also very important that the tire rasp blade leave a certain well-defined texture on the surface of the tire carcass from which the unwanted rubber has been removed. Too rough a surface will result in a poor bond between the tire carcass and the new tread, thereby causing premature failure of the retreaded tire.

A number of prior art tire rasp blades have been developed in an attempt to meet the performance characteristics noted above. Such rasp blades are disclosed, for example, in U.S. Pat. Nos. 3,879,825; 4,021,899; 4,091,516; and 4,283,819. Another tire rasp blade construction, representing an improvement over these prior art structures, is disclosed in my co-pending U.S. Patent application Ser. No. 07/166,176, filed Mar. 10, 1988. There still exists a need, however, for a durable tire rasp blade with excellent durability that removes rubber from the tire carcass at a faster rate, while providing excellent surface texture on the buffed tire and maintaining relatively lower buffing temperatures.

There is also a present need in the tire retreading trade for a more durable, yet efficient tire rasp blade for use with both flat-faced and curved-face buffing hubs. The durability of the tire rasp blade used in curved-face buffing hubs is particularly important because fewer numbers of blades contact the tire at any one time during the operation of the curved-face hub. Because a curved-faced buffing hub offers certain advantages over flat-faced hubs, a more durable, high performance blade for use in curved-faced hubs would make these hubs more attractive as alternatives to flat-faced hub assemblies.

SUMMARY OF THE INVENTION

The present invention is directed to a tire rasp blade found to overcome the problems associated with the prior art. The tire rasp blade constructed in accordance with the present invention is more efficient in removing rubber from the tread surface of the tire—it achieves rubber removal rates 50% to 100% greater than presently commercial tire rasp blades. It is also remarkably durable, with significantly less tooth breakage and a substantially longer useful working life than known commercial tire rasp blades. These improved performance characteristics are achieved, moreover, while still obtaining an excellent surface texture on the buffed tire and without generating excessive heat.

In accordance with the present invention, a tire rasp blade is provided for use in a tire buffing machine, and particularly a circumferential buffing machine, to remove rubber from a tire carcass. The tire rasp blade comprises an elongated body adapted for assembly in a rotating hub of the tire buffing machine and has a working portion including a plurality of uniformly and closely spaced teeth. The blade's working portion also has an outside arcuate working perimeter protruding from the hub. Each of the teeth has a base and a working edge and is separated from its neighboring teeth by generally elliptical primary cutouts oriented generally normal to the tangent of the working perimeter. Each of the teeth also has leading and trailing edges defined by the elliptical cutouts, with the leading edge forming a leading angle having an apex that points in the direction of rotation of the hub, and the trailing edge forming a trailing angle having an apex that points away from the direction of rotation of the hub.

One of the important design principles of the present invention is the utilization of the maximum number of teeth along the length of the blade, while at the same time arranging the teeth in optimum position and orientation relative to both the blade body and each other so that each tooth may most effectively address or attack the tire surface during the buffing operation.

In accordance with the present invention, each of these objectives is achieved by a tire rasp blade having all of its teeth arranged along the blade's working portion in uniformly and closely spaced relation—each tooth being separated from its neighboring teeth by generally elliptical shaped primary cutouts. These cutouts are oriented to be generally normal to the tangent of the blade's working perimeter and are truncated by the working perimeter so that the trailing and leading apexes of neighboring teeth are closely spaced.

The teeth of the blade's working edge are also laterally displaced from the plane of the blade's body portion. Thus, the teeth are formed or bent at their base so that they are positioned at an angle to the plane of the base. Preferably, the teeth are displaced in such a manner that approximately one-half of the teeth are displaced to one side and the other half are displaced to the opposite side. The lateral displacement of the teeth permits the use of the maximum number of teeth while still achieving the balance of properties that are essential to satisfactory blade performance.

In accordance with another preferred embodiment of the invention, the teeth are laterally displaced along the working edge of the blade in groups or sets. Most preferably, the teeth are in groups of two, or pairs, which are alternately displaced from one side to the other of the blade's body.

In still another embodiment of the invention, the relative size of the teeth and primary cutouts is set to achieve both the necessary close spacing of the teeth and enhanced heat transfer properties. In accordance with this embodiment of the invention, the primary elliptically shaped cutouts have a maximum width no greater than the minimum width of the blade's teeth. This arrangement assures sufficient mass in the body of the tooth to permit heat transfer or dissipation from its working edge through the base of the tooth and into the blade's body portion which acts as a heat sink. As a result, the teeth remain cooler during the buffing operation, giving the teeth greater durability and preventing heat build-up at the buffing interface between the blade and tire.

BRIEF DESCRIPTION OF THE DRAWINGS

The novel features of the invention are set forth in the appended claims. However, the invention's preferred embodiments, together with further objects and attendant advantages, will be best understood by reference to the following description taken in connection with the accompanying drawings in which:

FIG. 1 is an end view of a conventional flat-faced circumferential buffing machine hub and blade assembly;

FIG. 2 is a side elevational view illustrating a tire rasp blade made in accordance with one embodiment of the present invention;

FIG. 3 is an enlarged partial side elevational view of the working edge of the rasp blade of FIG. 2, but illustrating at an intermediate stage of manufacture in accordance with the present invention;

FIG. 4 is a partial plan view of the working edge of the rasp blade of FIG. 3;

FIG. 5 is a plan view similar to that of FIG. 4, but showing the angular setting of the teeth at a later intermediate stage of manufacture;

FIG. 6 is a plan view similar to FIGS. 4 and 5, but showing the angular setting and lateral displacement of the teeth in the final construction of the tire rasp blade of the present invention;

FIG. 7 is a cross-sectional view taken along line 7—7 of FIG. 6 and showing the angular set and lateral displacement of one tooth to one side of the blade body;

FIG. 8 is a cross-sectional view similar to that of FIG. 7, but taken along line 8—8 of FIG. 6, and showing the angular set and lateral displacement of another tooth to the opposite side of the blade's body; and FIG. 9 is an end view showing the arrangement of the tire rasp blade of the present invention as mounted in a curve-faced tire buffing machine hub.

DESCRIPTION OF THE PREFERRED EMBODIMENTS

With reference to FIG. 1, a buffing machine hub assembly, designated generally as 20, is shown with a plurality of tire rasp blades 22 and spacers 24 mounted in a conventional operational arrangement. As can be seen, the blades 22 are mounted on the circumference of the hub at alternating angles to the direction of hub rotation. In this way, the blades create an oscillating, side-to-side action as the hub rotates during buffing. This is, of course, conventional and well known to those of ordinary skill in the art. As shown in FIG. 2, the tire rasp blade 22 includes a body 32 and a working portion 34. It will be appreciated by those skilled in the art that body 32 is generally planar and is adapted for assembly, by means of mounting holes 36 or 38, to the rotatable rasp hub as illustrated in FIG. 1. When properly assembled to the hub of the buffing machine the working portion has its outside arcuate working perimeter 35 protruding from the hub. Of course, a set of blades 22 are used in the machine hub assembly and together they act to remove rubber from the used tire carcass and to condition the tire tread surface area in preparation for a subsequent retreading process.

The working portion 34 of blade 22 is the outer, arcuate part of the blade that contacts the tire and includes a unique arrangement of teeth 40. The shape or geometric configuration of the teeth 40 may vary in accord with the teachings of the prior art. However, particularly preferred tooth configurations are described in detail in U.S. Pat. Nos. 2,896,309; 3,082,506; 3,618,187; 3,879,825; 4,021,899; 4,059,875; and 4,091,516, the disclosures of which are incorporated herein by reference. It is important to understand, however, that it is only the tooth shape or configuration of these prior art patents that may be employed. The close and uniform positioning of each tooth relative to its neighboring teeth, the lateral displacement of the teeth, and the use of elliptical primary cutouts properly sized with the teeth are all novel and unique to the present invention.

The initial stage of manufacture for the tire rasp blade 22 of the present invention is clearly illustrated in FIGS. 3 and 4. At this stage of manufacture, the generally planar body 32 is provided with generally elliptical primary cutouts 54 to form teeth 40. The teeth 40 are preferably of a common size and configuration and each includes a working edge 41 and a base 43 which joins the tooth to the body 32 of the blade. Each tooth also includes a leading edge 46 which forms a leading angle 47 with working edge 41. The leading angle 47 terminates in a leading apex 49 which points in the direction of hub rotation. Each tooth also includes a trailing edge 48 which forms a trailing angle 51 with working edge 41. The trailing angle 51 terminates in a trailing apex 53 that points away from the direction of hub rotation. As just noted, the terms "leading" and "trailing" find their significance in relation to the movement of blade 22 as the rasp hub rotates. Blade movement, and hub rotation, are designated in the drawings by Arrow A. It is also desirable that each tooth include a centrally located semi-circular, v-shaped (or otherwise configured) cutout 50. The leading edges 46 and trailing edges 48 are defined by the size and shape of the cutouts 54.

Each of the primary cutouts 54 is generally elliptical in shape and is oriented such that its longitudinal axis is generally normal to the tangent of the working perimeter of the blade. This elliptical shape permits the use of teeth having sufficient size to achieve the desired strength while maintaining the desired closely spaced relationship and the necessary heat transfer properties. The elliptical cutouts 54 are cutoff or truncated at the perimeter of the blade such that the leading and trailing apexes of neighboring teeth are very closely aligned. Preferably, the elliptical cutout 54 has a longitudinal dimension X which is 1.5 times its maximum width Y. Moreover, the width Y is no greater than the minimum width Z of the tooth 40. In accordance with a particularly preferred embodiment of the invention, the longitudinal dimension of the cutout 54 is at least 0.200 inch while its maximum width Y is about 0.120–0.130 inch and the minimum width Z of tooth 40 is about 0.120–0.130 inch. In this embodiment, the spacing between the leading and trailing apexes of neighboring teeth is about 0.015–0.030 inch. In this exemplary embodiment, the dimension of tooth 40 along its working edge 41 from leading apex 41 to trailing apex 53 is about 0.220–0.250 inch and cutout 63 has a diameter of about 0.090–0.120 inch.

As previously stated, the teeth 40 are initially formed in accordance with the present invention by first making the elliptical cutouts 54 in the blade 22 so that the trailing edge of one tooth is immediately adjacent to or virtually contiguous with the leading edge of the next following tooth. In the preferred embodiment of the present invention, the span of the elliptical cutout 54 at its widest mid-section is about 0.130 inch and the longitudinal distance between the trailing and leading apexes of teeth 40, after lateral displacement and angular setting, is less than about 0.040 inch. In the illustrated embodiment, the cutouts 54 are of substantially the same shape and depth, thereby defining teeth of substantially common size and configuration. Moreover, the spacing between neighboring teeth is kept to a minimum and is uniform from tooth to tooth.

By constructing the working edge 14 of the blade with uniformly and closely spaced teeth, a maximum number of teeth and leading edges can be employed per unit length of the blade and a more aggressive action and faster rubber removal can be achieved. And because more teeth are doing the work of rubber removal, each tooth is subject to less stress with the result that teeth of substantially the same configuration and dimension exhibit better wear, are more durable and less subject to breakage as compared to prior art blades. Moreover, by constructing the teeth and elliptical cutouts so that the maximum width of the cutouts is substantially no greater than the minimum width of the teeth, a sufficient amount of material is present in the "neck" of each tooth to efficiently transfer heat from the working edge 41 into the blade body 32 and buffing machine hub, which together act as a substantial heat sink.

Another facet of the present invention is that the teeth 40 have a substantially monolithic construction; that is, the teeth have no holes, slits or other discontinuities between working edge 41 and base 43 to weaken the teeth or to inhibit heat transfer away from the working perimeter of the blade. Thus, the rasp blade exhibits improved durability and runs cooler even with a greater number of teeth per unit length of the blade.

Still another facet of the tire rasp blade design of the present invention is the positioning and orientation of the teeth. When using closely spaced teeth, care must be taken to assure that their leading edges are positioned in relation to neighboring teeth to properly address the tire surface for effective rubber removal. Accordingly, in the next phase of the manufacturing process, the teeth 40 are angularly set relative to blade body 32 as illustrated in FIG. 5. In this way, the leading and trailing apexes of each tooth, together with the respective trailing and leading edges, may be arranged to properly address the tire for efficient rubber removal.

It has been found in accordance with the present invention that by laterally displacing the teeth from the plane of the blade body, significant improvement in blade performance is achieved. As shown in FIGS. 6–8, the teeth are most preferably laterally displaced to form an angle of between approximately 1° and 7° with the main plane P of blade body 32. In addition, it has been found important to blade performance that the teeth be displaced to both sides of the blade body. In the preferred embodiment of the invention, the adjacent teeth are displaced in groups of two, or pairs, with the adjacent pairs of teeth being alternately displaced to one side and then the other of the blade body.

In the context of the present invention the term "laterally displaced" is intended to mean that each tooth 40 is bent or formed at its base 43 so that its free end 41 is offset relative to the centerline of the blade body 32. In other words, and as shown in FIGS. 7 and 8, the tooth 40 forms an angle D relative to the plane P of the blade body 32. In accordance with the preferred embodiment of the present invention, the teeth 40 are displaced from their base 41 at an angle of about 3° from the plane of the blade body. It has been found that at larger angles the teeth are less durable, and, at smaller angles the blade is not as efficient in the removal rate of rubber during the buffing operation.

As noted earlier, it is also preferred that the teeth 40 also be angularly set. As shown most clearly in FIG. 6, the angular setting is preferably made in a repeating series or cycle of four teeth. Thus, tooth 40A is angularly set across the plane of the blade and tooth 40C is given an opposite angular setting. This cycle is repeated beginning with tooth 40E. Also, the teeth are most preferably laterally displaced in pairs. Thus, as again shown in FIG. 6, teeth 40A and 40B are displaced to one side of the blade in the direction of arrow B, whereas teeth 40C and 40D are displaced to the opposite side of the blade in the direction of arrow C. Again, the cycle is repeated with the displacement of teeth 40E and 40F in the direction of arrow B. This alternating lateral displacement is continued throughout the entire length of the blade 22.

All of these design parameters are employed in the tire rasp blade illustrated in the drawings. This blade 22 has a working perimeter 35 with a longitudinal (i.e. circumferential) dimension of approximately 6.875 inches. All of the teeth are closely and uniformly spaced along the length of the blade thereby permitting as many as twenty-seven or twenty-eight teeth in a single blade. There are also groups 56 of two teeth displaced to one side along the blade's length, and alternating groups 58 of two teeth displaced to the opposite side. Each of the teeth is bent from its respective base 43 at an angle of approximately 3° from the plane of body 32. This illustrated blade exhibits exceptional rubber removal rates when used in conventional buffing machines —as much as 50%–100% faster than the known higher performance prior art blades. As a result, significant labor savings can be achieved in the retreading process with virtually no additional capital expense. Equally important, the blade produces a very high quality tread surface area texture without generating excessive heat. And all of this is achieved while retaining outstanding durability—as much as 60%–100% longer useful life. In short, the tire rasp blade of the present invention significantly outperforms any other known prior art blade.

The tire rasp blade of the present invention finds particularly advantageous use in combination with circumferential buffing machines and also curved face buffing machines. Moreover, it exhibits outstanding durability and strength when used with well known problem tires, such as high mileage steel belted radial tires using high durometer rubber compositions.

It will be appreciated by those skilled in the art that various modifications and changes can be made to the illustrated embodiments without departing from the spirit of the present invention. All such modifications and changes are intended to be covered by the appended claims.

I claim:

1. A tire rasp blade for use in a tire buffing machine to remove rubber from a tire carcass, said tire rasp blade comprising:
   an elongated body adapted for assembly in a rotating hub of the tire buffing machine;
   said body having a working portion comprising a plurality of uniformly and closely spaced teeth, and said working portion also having an arcuate working perimeter protruding from the hub;
   each of said teeth having a base and a working edge and being separated from neighboring teeth by generally elliptical primary cutouts, said cutouts each being oriented generally normal to the tangent of said working perimeter, each of said teeth also having leading and trailing edges defined by said cutouts, said leading edge forming a leading angle with said working edge having a leading apex that points in the direction of rotation of said hub, and said trailing edge forming a trailing angle with said working edge having a trailing apex that points away from the direction of rotation of said hub, said leading apex and said trailing apex of every neighboring pair of teeth being located within less than 0.030 inch; and
   a first portion of said teeth being laterally displaced to one side of said body and a second portion of said teeth being laterally displaced to the other side of said body, and at least one of said teeth from each of said first and said second portions being angularly set relative to the plane of said body, said lateral displacement of said teeth being at an angle to the plane of said body between about 1° and 7°, and said first and second portions together comprising all of said uniformly and closely spaced teeth.

2. The tire rasp blade of claim 1 wherein said generally elliptical cutouts are truncated at said working perimeter so that said leading apex and said trailing apex of neighboring teeth are closely spaced.

3. The tire rasp blade of claim 2 wherein said leading apex and said trailing apex of neighboring teeth are located within less than 0.020 inch.

4. The tire rasp blade of claim 1 wherein said first and second portions each comprises approximately one-half of said plurality of teeth.

5. The tire rasp blade of claim 1 wherein the length of each said elliptical cutout is at least one and one-half times greater than its width.

6. The tire rasp blade of claim 1 wherein said teeth are laterally displaced at an angle to the plane of said body of about 3°.

7. The tire rasp blade of claim 1 wherein said first portion of teeth is comprised of a plurality of first groups of two neighboring teeth and the second portion of teeth is comprised of a plurality of second groups of two neighboring teeth, said first and second groups being alternately displaced on opposite sides of the plane of said body.

8. A tire rasp blade for use in a tire buffing machine to remove rubber from a tire carcass, said tire rasp blade comprising:
   an elongated generally planar body adapted for assembly in a rotating hub of the tire buffing machine;
   said body having a working portion comprising a plurality of uniformly and closely spaced monolithic teeth, and said working portion also having an arcuate working perimeter protruding from the hub;
   each of said teeth having a base and a working edge and being separated from neighboring teeth by generally elliptical primary cutouts, said cutouts each being positioned generally normal to the tangent of said working perimeter and having a maximum width which is substantially no greater than the minimum width of said teeth, each of said teeth also having leading and trailing edges defined by said cutouts, said leading edge forming a leading angle with said working edge having a leading apex that points in the direction of rotation of said hub, and said trailing edge forming a trailing angle with said working edge having a trailing apex that points away from the direction of rotation of said hub; and
   a first portion of said teeth being laterally displaced to one side of said body and a second portion of said teeth being laterally displaced to the other side of said body, whereby said teeth form an angle to the plane of said body between about 1° and 7°.

9. The tire rasp blade of claim 8 wherein said first and second portions each comprises approximately one-half of said plurality of teeth.

10. The tire rasp blade of claim 8 wherein said teeth are laterally displaced at an angle to the plane of said body of about 3°.

11. The tire rasp blade of claim 8 wherein at least some of said teeth are also angularly set relative to the plane of said body.

12. The tire rasp blade of claim 8 wherein each of said monolithic teeth also includes a secondary cutout positioned generally midway between said leading apex and said trailing apex along said working edge.

13. The tire rasp blade of claim 8 wherein said primary cutouts have a maximum width of about 0.130 inch and said teeth have a minimum width of about 0.130 inch.

14. The tire rasp blade of claim 8 wherein the length of each said elliptical cutout is at least about 0.200 inch.

15. The tire rasp blade of claim 8 wherein said first portion of teeth is comprised of a plurality of first groups of two neighboring teeth and the second portion of teeth is comprised of a plurality of second groups of two neighboring teeth, said first and second groups being alternately displaced on opposite sides of the plane of said body.

16. The tire rasp blade of claim 8 wherein said generally elliptical cutouts are truncated at the perimeter of said working portion so that said leading apex and said trailing apex of neighboring teeth are closely spaced.

17. A method for forming a tire rasp blade for use in a tire buffing machine to remove rubber from a tire carcass, said tire rasp blade being constructed from a process comprising the steps of:
   providing an elongated generally planar blade body having an arcuate perimeter portion;
   forming a plurality of generally elliptical cutouts in said body along said arcuate perimeter portion, each of said cutouts being oriented generally normal to the tangent of said perimeter portion and being truncated at said perimeter portion, thereby defining a plurality of teeth having a base, a working edge, a leading edge and a trailing edge; said leading edge forming a leading angle with said working edge having a leading apex, and said trailing edge forming a trailing angle with said working edge having a trailing apex; said cutouts being uniformly and closely spaced such that the leading apex and the trailing apex of neighboring teeth are positioned in longitudinally close proximity in the plane of said body;

laterally displacing one portion of said teeth to one side of said body and a second portion of said teeth to the other side of said body such that said teeth form an angle to the plane of said body between about 1° and 7°.

* * * * *